United States Patent [19]

Asada

[11] Patent Number: 5,157,989
[45] Date of Patent: Oct. 27, 1992

[54] SHIFT CONTROL SYSTEM FOR AUTOMATIC TRANSMISSIONS

[75] Inventor: Toshiyuki Asada, Toyota, Japan
[73] Assignee: Toyota Jidosha Kabushiki Kaisha, Toyota, Japan
[21] Appl. No.: 733,815
[22] Filed: Jul. 22, 1991

[30] Foreign Application Priority Data

Jul. 24, 1990 [JP]  Japan .................................. 2-195675

[51] Int. Cl.⁵ ...................... I16H 03/66; B60K 41/06
[52] U.S. Cl. ..................................... 74/866; 475/276; 475/330; 74/861
[58] Field of Search ............... 364/424.1; 74/861, 866; 475/276, 330

[56] References Cited

U.S. PATENT DOCUMENTS

| | | | |
|---|---|---|---|
| 4,233,861 | 11/1980 | Gaus et al. .............................. | 74/763 |
| 4,660,439 | 4/1987 | Hiraiwa .................................. | 74/763 |
| 4,733,580 | 3/1988 | Kubo et al. ............................ | 74/866 |
| 4,897,790 | 1/1990 | Bieber ................................ | 74/866 X |
| 4,984,485 | 1/1991 | Kojima et al. ................ | 364/424.1 X |
| 5,025,684 | 6/1991 | Stehle et al. ....................... | 74/866 X |
| 5,035,160 | 7/1991 | Morita .................................. | 74/866 |
| 5,038,627 | 8/1991 | Schwaiger et al. ............... | 74/866 X |
| 5,053,962 | 10/1991 | Genise ............................. | 74/866 X |

FOREIGN PATENT DOCUMENTS 60-57036 4/1985 Japan .

*Primary Examiner*—Richard Lorence
*Assistant Examiner*—Khui Q. Ta
*Attorney, Agent, or Firm*—Oblon, Spivak, McClelland, Maier & Neustadt

[57] ABSTRACT

A shift control system for controlling the shifting of a vehicular automatic transmission including a plurality of frictional engagement members and having a plurality of engage/release combinations of the frictional engagement members for setting a predetermined one of gear stages. The shift control system comprises: a changer for effecting a change-over between an automatic shift mode for shifting the automatic transmission automatically on the basis of the running condition of the vehicle and a manual shift mode for shifting the same manually on the basis of the manipulation of the driver; and an engage/release pattern selector for selecting, in the manual shift mode, an engage/release combination of the frictional engagement members, which is different from the combination selected in the automatic shift mode, as that for setting the predetermined gear stage.

12 Claims, 3 Drawing Sheets

SHIFT CONTROL SYSTEM FOR AUTOMATIC TRANSMISSIONS

BACKGROUND OF THE INVENTION

The present invention relates to a shift control system for an automatic transmission capable of effecting an automatic shifting and a manual shifting and having a plurality of kinds of engage/release combinations of frictional engagement members for achieving a predetermined one of gear stages.

As is well known in the art, the automatic transmission for vehicles is required not only to be smallsized and lightweight and excellent and excellent in durability but also to be easily controlled for a shifting and have less shift shocks. Generally in the prior art, therefore, the controls for the shifting are facilitated, and the shift shocks are reduced by using a one-way clutch as engagement means for connecting or holding the rotating members of a gear train to change the engage/release states of the rotating members in accordance with the direction of torque application.

In dependence upon the structure of the gear train, however, the one-way clutch cannot be applied at all times to execute the shifting, but the shifting is sometimes executed by timing two frictional engagement means such as a multi-disc clutch and a multidisc brake or a band brake in their engagements or releases. In an automatic transmission capable of having a plurality of engage/release combinations (or patterns) of the frictional engagement means for one gear stage, on the other hand, the shifting for applying the one-way clutch is sometimes increased as much as possible by changing the engage/release patterns with that gear stage being set.

In the automatic transmission having a plurality of kinds of engage/release patterns for setting one gear stage, the aforementioned controls for changing the engage/release patterns can be accomplished to reduce the shift shocks. Since, moreover, any of the rotating members may have its rotational speed increased or decreased in accordance with some engage/release pattern, this engage/release pattern can be changed over to suppress the fluctuations in the rotational speed accompanying the shifting to reduce the shift shocks or to improve the durability of the frictional engagement means.

In the automatic transmission capable of selecting the plural engage/release patterns for each gear stage, the change-over of the engage/release patterns is effective at a predetermined gear stage so as to satisfy the aforementioned various requirements. In this case, the time period required for executing the shifting is naturally elongated.

Incidentally, a shifting in the automatic transmission is automatically effected by engaging or releasing the frictional engagement means on the basis of the running conditions such as the throttle opening or the vehicle speed. This change-over of the engage/release of the frictional engagement means can be caused in response to an (electric or hydraulic) output signal generated by the manual operation. The automatic transmission, if equipped with such mechanism, can perform both the automatic shifting and the manual shifting.

In the automatic transmission of this kind capable of interchanging the automatic-manual shifts, too, the several engage/release patterns, if any, of the frictional engagement means for establishing a predetermined gear stage are effectively switched at the gear stage to make the shifting possible by using a one-way clutch, for example, and to suppress the fluctuations in the rotational speeds of the rotating members. In case of the manual shift mode for the driver to time the shifting sensually, however, the time period for the shifting is elongated to cause a disadvantage in the apparently inferior responsiveness to the shifting, if a shift control is performed through another gear stage as in the automatic shift mode so as to avoid the simultaneous shifting.

SUMMARY OF THE INVENTION

A major object of the present invention is enable an automatic transmission capable interchanging the automatic shifting and the manual shifting to reduce the shift shocks in the automatic shift mode, to improve the durability of the frictional engagement means and to improve the responsiveness to the shifting in the manual shift mode.

Another object of the present invention is to provide a shift control system enabling the engage/release combinations of the frictional engagement means for setting a predetermined one of gear stages to be different in the automatic shift mode and the manual shift.

In order to achieve these objects, according to the present invention, there is provided a shift control system for controlling the shifting of a vehicular automatic transmission including a plurality of frictional engagement means and having a plurality of engage/release combinations of the frictional engagement means for setting a predetermined one of gear stages, which system comprises: change-over means for effecting a change-over between an automatic shift mode for shifting the automatic transmission automatically on the basis of the running condition of the vehicle and a manual shift mode for shifting the same manually on the basis of the manipulation of the driver; and engage/-release pattern select means for selecting, in the manual shift mode, an engage/release combination of the frictional engagement means, which is different from the combination selected in the automatic shift mode, as that for setting the predetermined gear stage.

In the shift control system of the present invention, the engage/release pattern select means includes means for selecting an engage/release combination of the frictional engagement means, in which at most two frictional engagement means are to have their operations changed over for a shifting, as that to be selected in the automatic shift mode.

In the shift control system of the present invention, moreover, the engage/release pattern select means includes means for switching, in the automatic shift mode, a first engage/release combination of the frictional engagement means for setting the predetermined gear stage into a second one, and for selecting, in the manual shift mode, the first combination or the second combination as the engage/release combination of the frictional engagement means for setting the predetermined gear stage.

The above and further objects and novel features of the present invention will more fully appear from the following detailed description when the same is read with reference to the accompanying drawings. It is to be expressly understood, however, that the drawings are for purposes of illustration only and is not intended as a definition of the limits of the invention.

DETAILED DESCRIPTION OF THE PREFERRED EMBODIMENTS

Figure 1:
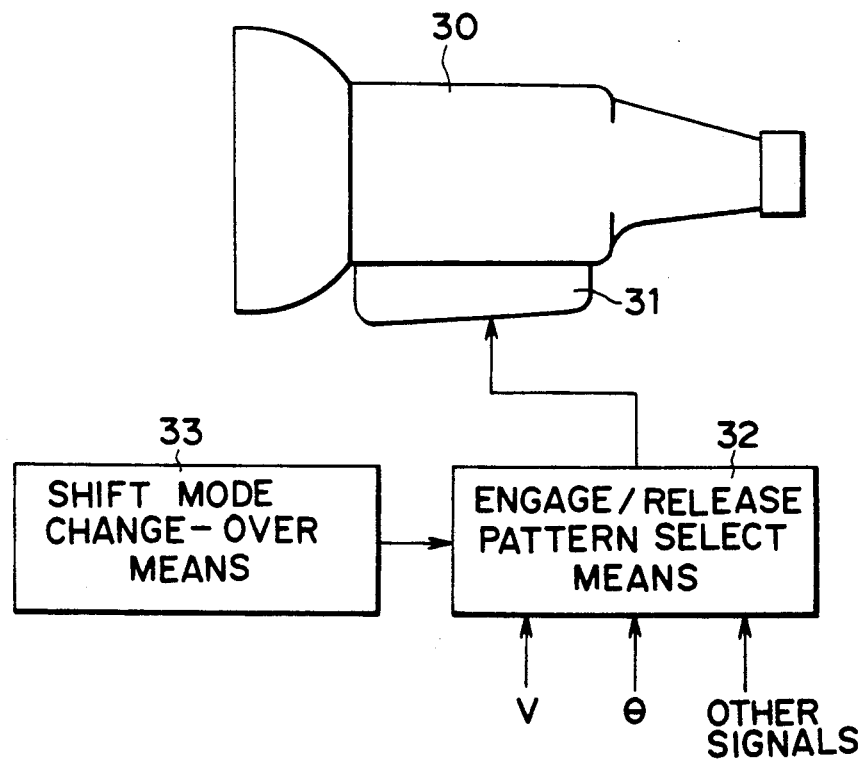
FIG. 1 is a block diagram showing the basic structure of a system according to the present invention.

The basic structure will be described at first with reference to FIG. 1. In FIG. 1, an automatic transmission 30 is equipped, as will be described hereinafter, with a plurality of frictional engagement means including clutches and brakes to be hydraulically controlled. This automatic transmission 30 is constructed to set a plurality of gear stages according to an engage/release combination of those frictional engagement means and to have a plurality of engage/release combinations of the frictional engagement means for setting a predetermined one of the gear stages. These frictional engagement means are controlled by a hydraulic control unit 31. This hydraulic control unit 31 is operated by electric means such as solenoid valves. The hydraulic control unit 31 is fed with electric signals by an engage/release pattern select means 32 for engaging or releasing the frictional engagement means suitably. This engage/release pattern select means 32 is equipped with maps for both the automatic and manual shiftings, for example. Moreover, the engage/release pattern select means 32 is fed with a vehicle speed V, a throttle opening $\theta$ and other signals and is connected with shift mode change-over means 33 for interchanging the automatic shift mode and the manual shift mode.

If the automatic shift mode is selected by the change-over means 33 in the system shown in FIG. 1, the engage/release pattern select means 32 follows the automatic shifting map to select the gear stage to be set and the engage/release combination of the frictional engagement means for setting the same gear stage in accordance with the running states dictated by the vehicle speed V and the throttle opening $\theta$ and to output its signal to the hydraulic control unit 31 so as to set the engage/release combination selected. The engage/release combination thus selected in the automatic shift mode is one having two or less frictional engagement means to have their engage/release states changed over at the shifting time from a predetermined gear stage to another. Thus, the engage/release combination of the frictional engagement means may be switched while the predetermined gear stage is being set. As a result, the shifting in the automatic shift mode can be easily controlled with less shift shocks because the number of the frictional engagement means to be changed over is small.

If, on the contrary, the manual shift mode is selected by the change-over means 33, the engage/release pattern select means 32 outputs a shift signal according to the manual shifting map to the hydraulic control unit 31. Specifically, the upshift signal or downshift signal is outputted to the engage/release pattern select means 32 by operating the change-over means 33. Then, the engage/release pattern select means 32 selects the engage/release combination of the frictional engagement means for setting a gear stage of one step up or down in accordance with the manual shifting map and outputs it to the hydraulic control unit 31. This manual shifting map is prepared with a main view to achieving a quick shifting and causes the pattern select means 32 to select a engage/release combination of the frictional engagement means different from that selected in the automatic shifting mode.

Figure 2:
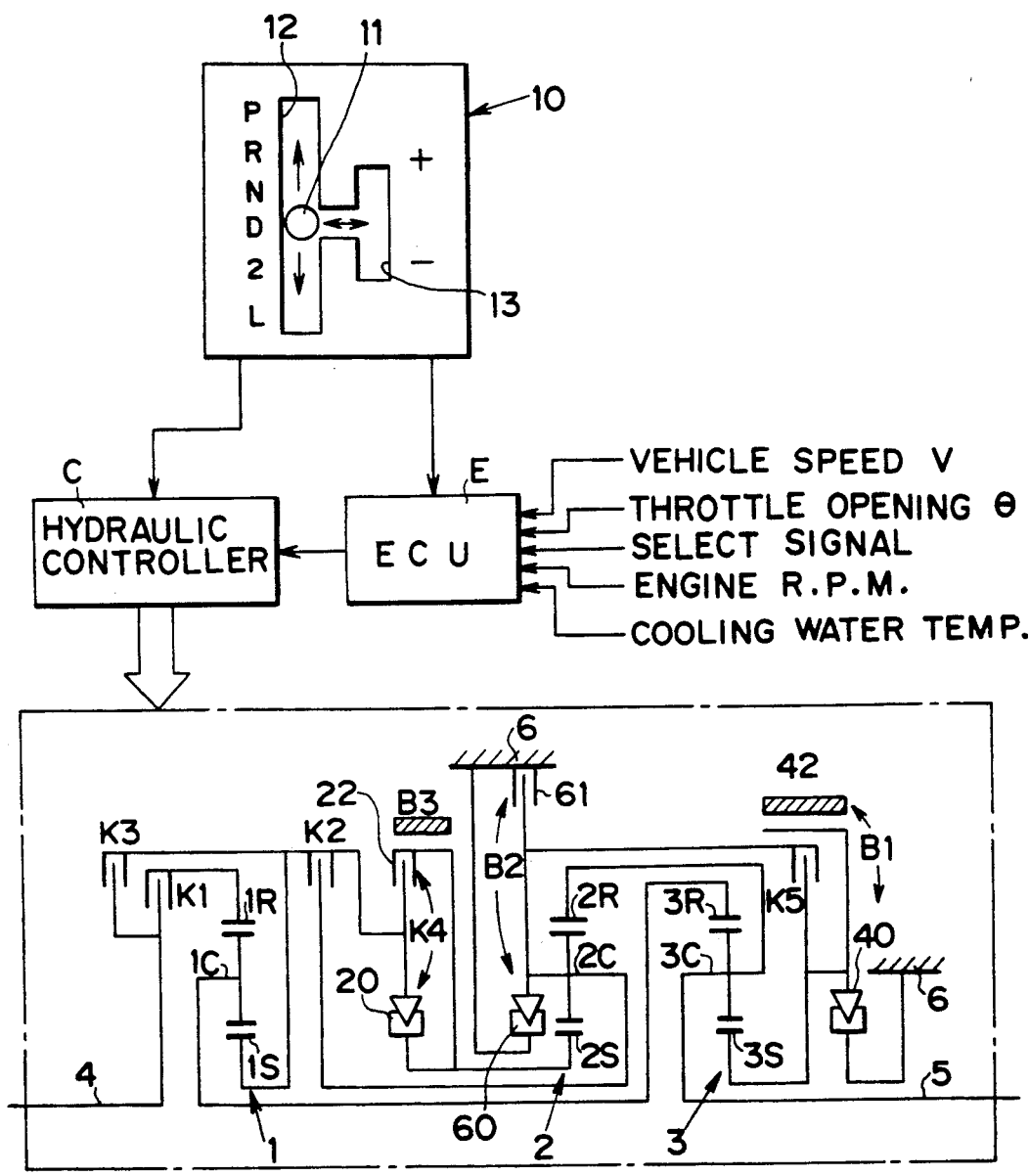
FIG. 2 is a block diagram showing one embodiment of the present invention.

A more specific example will be described in the following. An automatic transmission, as shown in FIG. 2, has its gear train constructed of three single-pinion type planetary gear sets 1, 2 and 3. These first to third planetary gear sets 1, 2 and 3 are arrayed on line between an input shaft 4 and an output shaft 5. The individual rotating elements of those planetary gear sets 1, 2 and 3, the input shaft 4 and the output shaft 5 are connected as follows. The first planetary gear set 1 has its carrier 1C connected integrally to the ring gear 3R of the third planetary gear set 3, and the second planetary gear set 2 has its ring gear 2R connected integrally to the carrier 3C of the third planetary gear set 3, to which the output shaft 5 is connected. There are also provided three sets of clutch units for connecting the individual rotating members of the planetary gear sets 1, 2 and 3 selectively. Specifically, the three clutch units are: a second clutch unit K2 for connecting the sun gear 1S of the first planetary gear set 1 and the carrier 2C of the second planetary gear set 2 selectively; a fourth clutch unit K4 for connecting the sun gear 1S of the first planetary gear set 1 and the sun gear 2S of the second planetary gear set 2 selectively; and a fifth clutch unit K5 for connecting the carrier 2C of the second planetary gear set 2 and the sun gear 3S of the third planetary gear set 3 selectively. Of these clutches, the fourth clutch unit K4 is composed of a one-way clutch 20 and a multi-disc clutch 22, which are juxtaposed to each other.

In addition to these clutch units, there are further provided: a first clutch K1 for connecting the input shaft 4 and the ring gear 1R of the first planetary gear set 1 selectively; and a third clutch K3 for connecting the input shaft 4 and the sun gear 1S of the first planetary gear set 1 selectively.

On the other hand, the brake means is exemplified by: a first brake unit B1 for holding the sun gear 3S of the third planetary gear set 3 selectively; a second brake unit B2 for holding the carrier 2C of the second planetary gear set 2 selectively; and a third brake unit B3 for holding the sun gear 2S of the second planetary gear set 2 selectively. Of these: the first brake unit B1 is composed of a one-way clutch 40 and a band brake 42, which are juxtaposed to each other; the second brake B2 is composed of a one-way clutch 60 and a multi-disc brake 61, which are juxtaposed to each other; and the third brake unit B3 is composed of a band brake.

Incidentally, reference numeral 6 designates a transmission casing (as will be shortly referred to as the "casing").

The automatic transmission equipped with the gear train shown in FIG. 2 is enabled in principle to set ten forward and one reverse gear stages, some of which individually have a plurality of kinds of engage/release patterns for setting themselves. However, the automatic transmission sets the five forward and one reverse gear stages, as enumerated in the clutch and brake application chart 1, of the ten forward and one reverse gear stages and the individual engage/release patterns, in accordance with the engage/release patterns enumerated together in the chart 1, because it is preferable: that the gear ratios be basically in a relation close to the geometric series; that any frequent shift be avoided; and that the fluctuations in the rotational speeds of the rotating members be as small as possible at the time of a shift. In the clutch and brake application chart 1: symbols ○ and ⊙ indicate the engaged states and the engaged states to be taken only at the time of engine braking, respectively; and blanks indicate the released states.

CHART 1

| | | Clutch Means | | | | | Brake Means | | | | |
|---|---|---|---|---|---|---|---|---|---|---|---|
| | | | | K4 | | | B1 | | B2 | | |
| | | K1 | K2 | K3 | 22 | 20 | K5 | 42 | 40 | 61 | 60 | B3 |
| 1st | | ○ | | | | ○ | ○ | ○ | ○ | ⊙ | ○ | |
| 2nd | | ○ | | | ⊙ | ○ | | ⊙ | ○ | | | ○ |
| 3rd | ① | ○ | | ○ | | ○ | | ⊙ | ○ | | | ○ |
| | ② | ○ | ○ | ○ | | ○ | | ⊙ | | | | |
| 4th | ① | ○ | | ○ | ○ | ○ | | | | ⊙ | ○ | |
| | ② | ○ | ○ | ○ | ○ | | | | | | | |
| 5th | | | ○ | ○ | | | ○ | | | | | ○ |
| Rev | | | | | ○ | ○ | | | ○ | ○ | | |

As the control means for setting the gear stages, as enumerated in the chart 1, there are provided: a hydraulic control unit C for feeding and releasing the oil pressures for engaging and releasing the aforementioned clutch units and brake units; and an electronic control unit (ECU) E for outputting electric instruction signals to the hydraulic control unit C on the basis of a variety of input data. The hydraulic control unit C is composed of pressure regulation valves, shift control valves, and solenoid valves for actuating the shift control valves, all of which may be those known in the prior art. Thus, the direct objects to be controlled by the electronic control unit E are exemplified by the solenoid valves in the hydraulic control unit C. On the other hand, the electronic control unit E is composed mainly of a microcomputer having computing functions and is fed with signals including the vehicle speed V, the throttle opening θ, the cooling water temperature, the running mode select signal and a brake signal.

Moreover, the automatic transmission shown in FIG. 2 is made possible to select the automatic shift mode for an automatic shifting on the basis of the running conditions such as the throttle opening θ and the vehicle speed V and the manual shift mode for a manual step-by-step shifting. For these selections, the automatic transmission is equipped with a shift unit 10 for interchanging those shift modes. In this shift unit 10, a shift lever 11 is operated to select one of the modes. In the automatic shift mode, the shift lever 11 is operated in an automatic shift gate 12 to select any of the parking (P), neutral (N), reverse (R) and drive (D) ranges. In the manual shift mode, on the other hand, the shift lever 11 is caused to output a signal for a one-step upshift, each time it is fell down to the plus side within a manual shifting gate 13 which is arranged in parallel with the automatic shifting gate 12, and a signal for a one-step downshift each time it is fallen down to the minus side. The shift unit 10 thus operated is connected electrically to the electronic control unit E and mechanically to the hydraulic control unit C through links or cables.

Incidentally, two kinds of engage/release patterns are prepared for the 3rd and 4th gear stages, as seen from the chart 1. This is intended to avoid the shift (i.e., the so-called "simultaneous shift"), in which three or more bi-directional engagement means such as multi-disc clutches or brakes or band brakes are to have their engage/release states stages changed simultaneously. In case of a shifting from the 2nd to 3rd speeds, the 3rd speed is set at first in accordance with the pattern of row ① (i.e., the 3-① pattern). If the third clutch means K3 is engaged in the state of 2nd speed, the one-way clutch 20 of the fourth clutch means K4 is automatically released to set the 3rd speed. In this state, the multi-disc clutch 22 of the fourth clutch means K4 is engaged, and the third brake means B3 is released to change the pattern to that of row ② (i.e., the 3-② pattern). If the second clutch means K2 is then engaged, the one-way clutch 40 of the first brake means B1 is automatically released to set the 4th speed in accordance with the pattern of row ① (i.e., the 4-① pattern). In this state, the fifth clutch means K5 is engaged, but the first clutch means K1 is released to engage the one-way clutch 20 in the fourth clutch means K4 thereby to change the pattern into that of row ② (i.e., the pattern 4-②). If the third brake means B3 is engaged in this state, the one-way clutch 20 in the fourth clutch means K4 is automatically released to set the 5th speed.

In the shift control system of the present invention, the aforementioned change in the engage/release patterns is executed in the automatic shift mode, but different engage/release patterns are selected in the manual shift mode.

Figure 3:
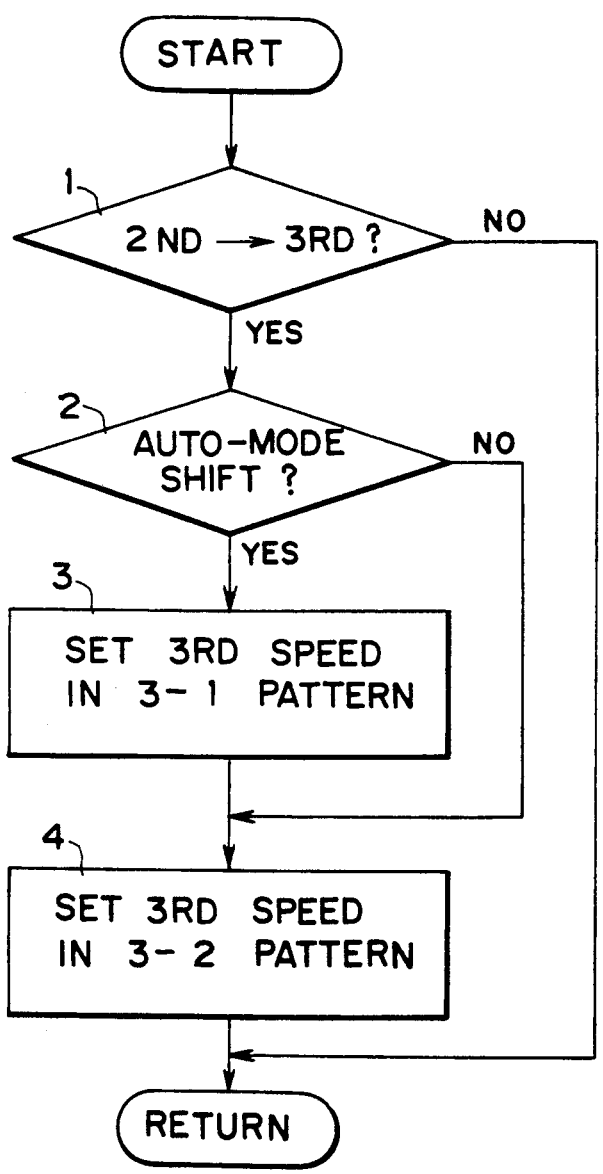
FIG. 3 is a flow chart showing one example of a control routine for making the frictional engagement means different for the automatic shift mode and the manual shift mode.

The control routine in case of the shift from the 2nd to 3rd speeds is exemplified in the form of flow chart in FIG. 3. If the upshift from the 2nd to 3rd speeds is decided at Step 1 (i.e., "YES" at Step 1), it is then decided (at Step 2) whether or not the upshift is in the automatic shift mode. Of these, the decision at Step 1 is accomplished by the electronic control unit E on the basis of either the running conditions such as the throttle opening θ and the vehicle speed V or the upshift inputted from the shift unit 10. On the other hand, the decision at Step 2 is accomplished by the electronic control unit E on the basis of the output signal coming from the shift unit 10. If in the automatic shift mode, i.e., if the answer at Step 2 is "YES", the 3-① pattern is selected as the engage/release pattern for setting the 3rd speed and used (at Step 3) to set the 3rd speed. After this, the 3-② pattern is selected (at Step 4) to change the engage/release pattern for setting the 3rd speed. This selection of the engage/release patterns is accomplished according to the map stored in advance, for example. After this, the control routine is returned.

In this case, therefore, a smooth shifting can be attained by applying the one-way clutch 20 in the fourth clutch means K4.

If the manual shift is selected, i.e., if the answer of Step 2 is "NO", the routine advances directly to Step 4, at which the 3-② pattern is selected as the engage/release pattern for setting the 3rd speed thereby to set the 3rd speed. This selection of the engage/release patterns is accomplished according to the manual shifting map stored in advance, for example. From the state of the 2nd speed, the third clutch means K3 and the multi-disc clutch 22 of the fourth clutch means K4 are engaged, but the third brake means B3 is released to execute the upshift to the 3rd speed.

If the answer of Step 1 is "NO", the control routine is directly returned.

In case, therefore, upshifts of 2nd speed→3rd speed→4th speed are to be continuously accomplished, the 3-① pattern is once set at the 3rd speed in the automatic shift mode so as to avoid the shift shocks. In case of the manual shift mode, on the contrary, the aforementioned continuous shifts can be quickly accomplished because of bypassing the 3-① pattern. Since there is little delay in response in the manual shift mode, the driver can be kept away from any physical disorder. In case of the manual shift mode, the shift shocks are slightly increased because of the so-called simultaneous shifting, in which two or more bi-directional engagement means are simultaneously changed over. However, this increase of the shift shocks occurs while the driver is conscious of the execution of the shifting, so that the driving comfortableness is not especially deteriorated.

In the example thus far described, the 3rd speed is set according to the 3-② pattern in case of the manual shift mode. According to the present invention, however, the 3rd speed may also be set according to the 3-① pattern and then shifted up to the 4th speed. In this case, the upshift to the 4th speed belongs to the simultaneous shifting. Moreover, the method of the present invention can be applied to the case, in which a shifting is to be accomplished to and from a gear stage having a plurality of kinds of engage/release patterns. In connection with the automatic transmission shown in FIG. 2, the present invention can be further applied not only to the upshift from the 2nd to 3rd speeds but also to the upshift from the 3rd to 4th speeds or the downshifts among these gear stages. The method of the present invention can be further applied not only to the automatic transmission shown in FIG. 2 but also to the automatic transmissions having the structures, which have been disclosed in the specifications and drawings of Japanese Patent Applications Nos. 185151/1989, 85152/1989, 186991/1989, 186992/1989, 205478/1989 and 280957/1989 already proposed by us.

Here will be synthetically described the advantages of the present invention. The automatic transmission capable of selecting the automatic and manual shifts can be shifted in excellent response because its manual shifting is not restricted by the requisites for the automatic shifting.

What is claimed is:

1. A shift control system for controlling the shifting of an automatic transmission in a vehicle, including a plurality of frictional engagement means and having a plurality of engage/release combinations of said frictional engagement means for setting a predetermined one of gear stages, comprising:
    change-over means for effecting a change-over between an automatic shift mode for shifting the automatic transmission automatically based on a running condition of the vehicle and a manual shift mode for shifting the same manually; and
    engage/release pattern select means for selecting, in the manual shift mode, an engage/release combination of said frictional engagement means, which is different from the combination selected in said automatic shift mode, as that for setting said predetermined gear stage.

2. A shift control system according to claim 1, wherein said engage/release pattern select means includes means for selecting an engage/release combination of said frictional engagement means, in which at most two frictional engagement means are to have their operations changed over for a shifting, as that to be selected in said automatic shift mode.

3. A shift control system according to claim 1, wherein said engage/release pattern select means includes means for switching, in said automatic shift mode, a first engage/release combination of said frictional engagement means for setting said predetermined gear stage into a second one, and for selecting, in said manual shift mode, said first combination or said second combination as the engage/release combination of said frictional engagement means for setting said predetermined gear stage.

4. A shift control system according to claim 1, wherein said change-over means includes: a shift lever; a first gate for guiding said shift lever linearly in said automatic shift mode; a second gate for guiding said shift lever in parallel with said first gate in said manual shift mode; and means for outputting an upshift signal and a downshift signal if said shift lever is operated in said second gate.

5. A shift control system according to claim 1, wherein said automatic transmission comprises:
    an input shaft;
    an output shaft;
    a first planetary gear set including a first sun gear, a first ring gear, a pinion gear meshing with both said first sun gear and said first ring gear, and a first carrier supporting said pinion gear;
    a second planetary gear set including a second sun gear connected to said first sun gear, a second ring gear, a pinion gear meshing with both said second sun gear and said second ring gear, and a second carrier supporting said pinion gear; and
    a third planetary gear set including a third sun gear connected to said second carrier, a third ring gear connected to said first carrier, a pinion gear meshing with both said third sun gear and said third ring gear, and a third carrier supporting said pinion gear and connected to said second ring gear.

6. A shift control system according to claim 5, wherein said automatic transmission comprises:
    first clutch means for connecting said input shaft and said first ring gear selectively;
    second clutch means for connecting said first sun gear and said second carrier selectively;
    third clutch means for connecting said input shaft and said first sun gear selectively;
    fourth clutch means for connecting said first sun gear and said second sun gear selectively;
    first brake means for holding the rotation of said second carrier selectively; and
    second brake means for holding the rotation of said second sun gear selectively, and
    wherein said output shaft is connected to said second ring gear or said third carrier.

7. A shift control system according to claim 6, wherein said fourth clutch means includes a multi-disc clutch, and a one-way clutch juxtaposed to said multi-disc clutch.

8. A shift control system according to claim 7, wherein said first brake means is a band brake.

9. A shift control system according to claim 6, wherein said second brake means includes a multi-disc brake, and a one-way clutch juxtaposed to said multi-disk brake.

10. A shift control method for controlling the shifting of an automatic transmission in a vehicle, including a plurality of frictional engagement means and having a plurality of engage/release combinations of said frictional engagement means for setting a predetermined one of gear stages, comprising the steps of:
    changing over an automatic shift mode for shifting the automatic transmission automatically based on a running condition of the vehicle to a manual shift mode for shifting the same manually and selecting an engage/release combination of said frictional engagement means, in the manual shift mode which is different from the combination selected in said automatic shift mode, as that for setting said predetermined gear stage.

11. A shift control method according to claim 10, further comprising the step of:

selecting in an automatic shift mode an engage/release combination of said frictional engagement means, in which at most two frictional engagement means are to have their operations changed over for a shifting.

12. A shift control method according to claim 10, further comprising the steps of:

switching a first engage/release combination of said frictional engagement means for setting said predetermined gear stage in said automatic shift mode, into a second combination, and selecting said first combination or said second combination in said manual shift mode, as the engage/release combination of said frictional engagement means for setting said predetermined gear stage.

* * * * *